United States Patent
Merli et al.

(10) Patent No.: US 10,988,660 B2
(45) Date of Patent: Apr. 27, 2021

(54) RHEOLOGY MODIFIER FOR SUBTERRANEAN TREATMENT FLUIDS

(71) Applicant: LAMBERTI SPA, Albizzate (IT)

(72) Inventors: Luigi Merli, Saronno (IT); Erik Gallo, Mottalciata (IT); Pierangelo Pirovano, Comerio (IT); Giovanni Floridi, Novara (IT); Giuseppe Li Bassi, Gavirate (IT)

(73) Assignee: Lamberti SPA, Albizzate (IT)

( * ) Notice: Subject to any disclaimer, the term of this patent is extended or adjusted under 35 U.S.C. 154(b) by 237 days.

(21) Appl. No.: 16/338,182

(22) PCT Filed: Oct. 3, 2017

(86) PCT No.: PCT/EP2017/075081
§ 371 (c)(1),
(2) Date: Mar. 29, 2019

(87) PCT Pub. No.: WO2018/065415
PCT Pub. Date: Apr. 12, 2018

(65) Prior Publication Data
US 2020/0024501 A1    Jan. 23, 2020

(30) Foreign Application Priority Data
Oct. 5, 2016    (IT) .................. 102016000099353

(51) Int. Cl.
C09K 8/36 (2006.01)
C09K 8/502 (2006.01)
C09K 8/565 (2006.01)
C09K 8/64 (2006.01)
C09K 8/60 (2006.01)

(52) U.S. Cl.
CPC ............... *C09K 8/36* (2013.01); *C09K 8/502* (2013.01); *C09K 8/565* (2013.01); *C09K 8/64* (2013.01); *C09K 8/602* (2013.01)

(58) Field of Classification Search
CPC .......... C09K 8/36; C09K 8/502; C09K 8/565; C09K 8/64; C09K 8/602; C09K 8/82
See application file for complete search history.

(56) References Cited

U.S. PATENT DOCUMENTS

2014/0142004 A1* 5/2014 Mesher ................ C09K 8/035
507/130
2016/0310384 A1* 10/2016 Sakanishi ................ A61K 8/92

FOREIGN PATENT DOCUMENTS

WO   WO 2013/040718 A1   3/2013
WO   WO 2014/043819 A1   3/2014

OTHER PUBLICATIONS

Tong, et al. Pyromellitamide Gelators: Exponential Rate of Aggregation, Hierarchical Assembly, and Their Viscoelastic Response to Anions. Langmuir Article, Mar. 18, 2009; 25(15); 8586-8592.
International Search Report for PCT/EP2017/075081 dated Dec. 4, 2018.
Written Opinion of the international Search Authority for PCT/EP2017/075081 dated Dec. 4, 2018.

* cited by examiner

*Primary Examiner* — Kumar R Bhushan
(74) *Attorney, Agent, or Firm* — Vorys, Sater, Seymour and Pease LLP; Iona Niven Kaiser

(57) ABSTRACT

The present invention relates to a rheology modifier and to its use as thickener in oil-based subterranean treatment fluids; more particularly, the rheology modifier is an aqueous slurry of a pyromellitamide.

9 Claims, No Drawings

RHEOLOGY MODIFIER FOR SUBTERRANEAN TREATMENT FLUIDS

CROSS REFERENCE TO RELATED APPLICATIONS

This application is the U.S. national phase of PCT/EP2017/075081 filed on Oct. 10, 2017, which claims priority to Italian patent application no. 102016000099353 filed on Oct. 10, 2016, the contents of both applications are hereby expressly incorporated by reference herein.

FIELD OF THE INVENTION

The present invention relates to a rheology modifier and to its use as thickener in oil-based subterranean treatment fluids; more particularly, the rheology modifier is an aqueous slurry of a pyromellitamide.

STATE OF THE ART

Various types of subterranean treatment fluids, such as drilling fluids, are used in operations related to the development, completion, and production of natural hydrocarbon reservoirs.

These fluids may be classified according to their fluid base. Water base fluids contain solid particles suspended in water or brine. Alternatively, oil based fluids contain solid particles suspended in an oil continuous phase.

Oil-based fluids can be either all-oil based or water-in-oil emulsions, which are also called invert emulsions. Water-in-oil emulsions have the oil phase as the continuous phase and a fluid at least partially immiscible in the oil phase (usually an aqueous-based fluid) as discontinuous phase.

Oil-based fluid, and in particular water-in-oil emulsions, are preferred as drilling fluids when the formation is remarkably sensitive to contact with water and they have usually a better thermal resistance and guarantee better lubrication of the drill strings and downhole tools, thinner filter cake formation and improved hole stability.

A number of specific additives may be included in such oil-based fluids and to invert emulsions to improve certain properties of the fluid. Such additives may include, for example, emulsifiers, weighting agents, fluid-loss control agents, rheology modifiers (thickeners or gelling agents) and alkalies.

Usually, oil-based fluids are viscosified by addition of one or more rheology modifiers that should be able to control the rheology of the fluid in the whole range of operating temperatures, of solids concentrations and of applied shear rate. A typical function of the rheology modifiers is in fact to suspend cuttings, especially when the fluid is at rest.

Many rheology modifiers for oil-based fluids, such as organophilic clays, different kinds of polymers, fatty acid or dimer acid derivatives, are known in the art.

Remarkable examples of suitable rheology modifiers, showing excellent thickening and rheological behaviour at various temperatures, are described in WO 2013/040718 and WO 2014/043819. These rheology modifiers are useful in various subterranean applications where oil-based fluids are necessary.

In particular, WO 2013/040718 discloses a downhole fluid which comprises a base fluid, for example a hydrocarbon base fluid, and a pyromellitamide gelling agent. The pyromellitamide gelling agent has the general formula I:

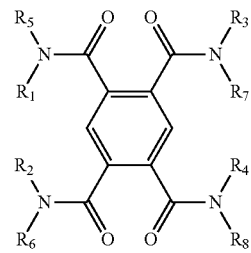

wherein each of $R_1$, $R_2$, $R_3$, $R_4$, $R_5$, $R_6$, $R_7$ and $R_8$ is hydrogen or an organic group.

WO 2014/043819 describes a downhole fluid comprising a base fluid, for example a hydrocarbon base fluid, a gelling agent, and a gel enhancer. The gelling agent has an aromatic core of one or more aromatic rings, having two or more amide branches distributed around the aromatic core, each of the two or more amide branches having one or more organic groups. An exemplary gelling agent is a pyromellitamide gelling agent.

Unfortunately, pyromellitamide gelling agents are very sticky, gummy solids, which are very difficult to manipulate, dissolve/disperse and dose. Moreover, it is particularly laborious, almost impossible, to dissolve these solids efficiently and quickly into the oil phase of the subterranean treatment fluids, which usually contain high amounts of undissolved solids, so that the viscosity development is quite slow. The slow development of viscosity can result in wasting of time and/or dosing problems.

In WO 2013/040718, the Applicant suggests to provide the pyromellitamide gelling agents suspended in an appropriate carrier, for example an inert carrier like glycols (i.e. ethylene glycol). Unfortunately, these suspensions are not generally stable in terms of phase separation upon storage without some sort of agitation or circulation even in the presence of a suspending aid, further complicating the dosing in comparison with the solid gelling agent.

It would be an improvement to provide stable compositions comprising said pyromellitamide gelling agents and method of use of such compositions which are capable of quickly and effectively thickening oil-based subterranean treatment fluids.

We have now found that slurries comprising a pyromellitamide gelling agent, a mutual solvent, a thickener for aqueous systems and water can be quickly dissolved in oil based subterranean treatment fluids. These slurries are stable for a long period without phase separations and may be easily manipulated, transported and dosed. Moreover, they can have a high (up to 50% by weight) active content, allowing to eliminate the need for transporting large amounts of inert materials.

The pyromellitamide slurries show excellent properties as rheology modifiers when they are used in oil-based subterranean treatment fluids, being able to guarantee an optimal stability of the fluids in the presence of large amount of solids/contaminants and even at the high temperatures which can be found in the subterranean treatments, for example in oil well drilling.

DESCRIPTION OF THE INVENTION

It is therefore a fundamental object of the present invention a slurry comprising:

a) from 10 to 50% by weight (% wt), preferably from 12 to 35% by weight, of a pyromellitamide of formula I:

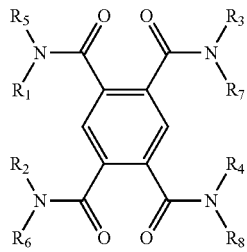

wherein $R_1$, $R_2$, $R_3$, and $R_4$ are, independently from each other, a linear or branched $C_4$-$C_{24}$ alkyl chain and $R_5$, $R_6$, $R_7$ and $R_8$ are, independently from each other, hydrogen or a linear or branched $C_4$-$C_{24}$ alkyl chain;

b) from 20 to 65% wt, preferably from 30 to 50% wt, of a mutual solvent;

c) from 0 to 10% wt, preferably from 5 to 10% wt, of a water-soluble inorganic salt;

d) from 0.05 to 5% wt, preferably from 0.3 to 3% wt, of a thickener for aqueous systems;

e) from 10 to 50% wt, preferably from 15 to 30% wt, of water.

In one embodiment, the present invention provides an oil-based subterranean treatment fluid comprising an oil phase and said slurry, as reology modifier.

The features and advantages of the present invention will be readily apparent to those skilled in the art upon reading the description of the preferred embodiments which follows.

DETAILED DESCRIPTION OF THE INVENTION

Preferably, in formula I, $R_1$, $R_2$, $R_3$, and $R_4$ are, independently from each other, a linear or branched $C_6$-$C_{14}$ alkyl chain and $R_5$, $R_6$, $R_7$, and $R_8$ are, independently from each other, hydrogen or a linear or branched $C_6$-$C_{14}$ alkyl chain.

More preferably, in formula I, $R_1$, $R_2$, $R_3$, and $R_4$ are, independently from each other, a linear or branched $C_6$-$C_{10}$ alkyl chain and $R_5$, $R_6$, $R_7$, and $R_8$ are, independently from each other, hydrogen or a linear or branched $C_6$-$C_{10}$ alkyl chain.

In a further preferred embodiment, $R_1$, $R_2$, $R_3$, $R_4$ are identical and are a linear or branched $C_6$-$C_{10}$ alkyl chain and $R_5$, $R_6$, $R_7$, and $R_8$ are all hydrogen.

In a particularly preferred embodiment, $R_1$, $R_2$, $R_3$, $R_4$ are identical and are a linear $C_6$-$C_{10}$ alkyl chain and $R_5$, $R_6$, $R_7$, and $R_8$ are all hydrogen.

The pyromellitamides of formula I according to the invention can be prepared following any of the procedures known in the art. For example, the synthesis of suitable pyromellitamides may be carried out in two stages, as described in WO 2013/040718: i) preparing the intermediate benzene-1,2,4,5-tetracarbonyl tetrachloride and ii) reacting it with an appropriate $C_4$-$C_{24}$ (di)alkyl amine.

With the expression "mutual solvent" we mean a solvent having a polar, water-soluble group attached to a nonpolar hydrocarbon chain. Mutual solvents are additives, used in oil field and well applications, that are soluble in oil, water and acid-based treatment fluids, wherein they are routinely used for removing heavy hydrocarbon deposits, controlling the wettability of the contact surfaces before, during or after a treatment, and preventing or breaking emulsions. In some embodiments, the mutual solvent may be substantially completely soluble in each phase, while in other embodiments, a low degree of solubilization may be preferable.

Illustrative examples of mutual solvents include linear or branched $C_1$-$C_6$ alcohols, such as methanol, ethanol, 2-propanol, n-butanol and isobutanol; glycols and polyglycols, such as monoethylene glycol, monopropylene glycol, diethylene glycol, dipropylene glycol, triethylene glycol, tripropylene glycol, hexylene glycol, and higher glycols; glycol ethers, such as 2-methoxyethanol, 2-propoxyethanol, 2-ethoxyethanol, ethylene glycol monobutyl ether, propylene glycol monobutyl ether, diethyleneglycol monomethyl ether dipropylene glycol monomethyl ether, diethylene glycol monoethyl ether, dipropylene glycol monoethyl ether, diethylene glycol monobutyl ether, dipropylene glycol monobutyl ether, triethylene glycol monoethyl ether, triethylene glycol monobutyl ether, tripropylene glycol monobutyl ether, and the like; polyols, such as glycerol, diglycerol, polyglycerol, pentaerythritol, dipentaerythritol, trimethylol propane, ditrimethylol propane; various esters, such as ethyl lactate, propylene carbonate, butylene carbonate; water and oil-soluble ketones, acetals, ketals, pyrrolidones; mixtures thereof.

The mutual solvent is preferably selected from the group which consists of linear or branched $C_1$-$C_6$ alcohols, glycols, polyglycols, glycol ethers, polyols and mixtures thereof.

Specific examples of preferred mutual solvents are monoethylene glycol, diethylene glycol, monopropylene glycol, glycerol, pentaerythritol, trimethylol propane, ethylene glycol monobutyl ether, diethylene glycol monobutyl ether, triethylene glycol monobutyl ether and mixtures thereof.

Examples of water-soluble inorganic salts that are suitable for the preparation of the pyromellitamide slurry are: sodium chloride, potassium chloride, calcium chloride, ammonium chloride, sodium bromide, calcium bromide, zinc bromide, sodium formate, potassium formate, cesium formate, sodium acetate, potassium acetate, calcium acetate, ammonium acetate, ammonium bromide, sodium nitrate, potassium nitrate, ammonium nitrate, calcium nitrate, sodium bicarbonate, potassium bicarbonate, ammonium bicarbonate, sodium carbonate, potassium carbonate, sodium sulphate, potassium sulphate, ammonium sulphate and mixtures thereof.

Preferred water-soluble inorganic salts are sodium bicarbonate, potassium bicarbonate and ammonium bicarbonate.

The thickener for aqueous systems suitable for the preparation of the slurry of the invention can be chosen among inorganic or organic thickeners for aqueous systems commonly used in the field.

Suitable organic thickeners are natural, semisynthetic and synthetic water-soluble polymers, known to those expert in the art, and mixtures thereof.

The natural and semisynthetic water-soluble polymers, which can be used for the realization of the present invention, are, for example, natural gums and their derivatives. Specific examples include: alginates; cellulose derivatives, such as carboxymethyl cellulose and hydroxyalkyl cellulose; starch and starch derivatives, such as carboxymethyl starch; galactomannan gums and galactomannan gum derivatives, such as guar gum and guar gum derivatives, for example carboxymethyl guar and hydroxypropyl guar; xyloglucans and xyloglucan derivatives, such as tamarind gum and its derivatives; xanthan gum, arabic gum, tragacanth gum; mixtures thereof.

According to the present invention, said organic thickener for aqueous systems can be also a water-soluble synthetic polymer, preferably a product of polymerization of at least one ethylenically unsaturated monomer. Preferably, the synthetic polymer is a product of polymerization of an ethylenically unsaturated anionic monomer and/or of an ethylenically unsaturated nonionic monomer, optionally in the presence of a crosslinking agent. The anionic monomer can be selected among ethylenically unsaturated mono- or di-carboxylic acids or salts thereof or anhydrides thereof, such as acrylic acid, methacrylic acid, itaconic acid, crotonic acid, maleic acid, fumaric acid; among sulfonic acids or salts thereof, such as 2-acrylamido-2-methyl propane sulfonic acid (AMPS) and vinyl sulfonic acid; and mixtures thereof.

Suitable nonionic monomers include ethylenically unsaturated amides; (meth)acrylic $C_1$-$C_6$ alkyl esters, substituted or unsubstituted with hydroxy or amino groups; ethylenically unsaturated alcohols and their esters; styrene and substituted styrenes; vinyl monomers. Specific examples are acrylamide, methacrylamide, N-alkyl acrylamide, N-vinyl pyrrolidone, methyl acrylate, ethyl acrylate, n-propyl acrylate, hydroxyethyl (meth)acrylate, hydroxypropyl (meth)acrylate, vinyl alcohol, vinyl acetate, and the like.

Suitable inorganic thickeners for aqueous system are, for example, thickening silicas and natural or synthetic water-swellable clays. Examples of thickening silicas include AEROSIL® T series from Degussa or the CAB-O-SIL® series from Cabot Corporation.

Examples of suitable natural swelling clays are the swelling clays of the smectite family, a well known family of three-layer clay minerals containing a central layer of alumina or magnesia octahedra sandwiched between two layers of silica tetrahedra and have an idealized formula is based on that of pyrophillite which has been modified by the replacement of some of the $Al^{+3}$, $Si^{+4}$, or $Mg^{+2}$ by cations of lower valency to give an overall anionic lattice charge. The swelling clays of the smectite family include montmorillonite, which includes bentonite, beidellite, nontronite, saponite, stevensite and hectorite.

For the realization of the present invention, bentonite is the preferred natural swelling clay, sodium bentonite is particularly preferred.

Examples of suitable synthetic water-swellable clays belong to the LAPONITE® series from BYK.

In a preferred embodiment the slurry of the invention also comprises:
f) from 0.1 to 10% by weight, preferably from 0.5 to 6% by weight, of a surfactant.

The surfactant can be an anionic, cationic, non-ionic, ampholytic surfactant or mixtures thereof.

Suitable surfactants are, for example, nonionic emulsifiers and dispersants, such as:
polyalkoxylated, preferably polyethoxylated, saturated and unsaturated, aliphatic alcohols, having 8 to 24 carbon atoms, deriving from the corresponding fatty acids or from petrochemical processes, and having an average degree of alkoxylation (ethoxylation) of between 1 and 100, preferably between 4 and 40;
polyalkoxylated, preferably polyethoxylated, arylalkylphenols, such as, for example, polyalkoxylated tristyrylphenol, having an average degree of alkoxylation (ethoxylation) of between 8 and 80, preferably between 16 and 40;
polyalkoxylated, preferably polyethoxylated, alkylphenols having one or more alkyl radicals, such as, for example, polyalkoxylated nonylphenol or tri-sec-butylphenol, with an average degree of alkoxylation (ethoxylation) of between 2 and 40, preferably between 4 and 20;
polyalkoxylated, preferably polyethoxylated, hydroxy-fatty acids or glycerides of hydroxy-fatty acids, such as, for example, polyalkoxylated castor oil, having an average degree of alkoxylation (ethoxylation) of between 10 and 80;
sorbitan or sorbitol esters of fatty acids or polyalkoxylated, preferably polyethoxylated, sorbitan or sorbitol esters of fatty acids;
polyalkoxylated, preferably polyethoxylated, amines;
di- or tri-block copolymers from alkylene oxides, for example from ethylene oxide and propylene oxide, having average molecular weight between 200 and 8000 g/mol, preferably between 1000 and 4000 g/mol;
alkylpolyglycosides or polyalkoxylated, preferably polyethoxylated, alkylpolyglycosides.

Anionic surfactants are also suitable, for example:
alkali metal and alkaline earth metal salts of polyalkoxylated, preferably polyethoxylated, surfactants which are ionically modified, for example by conversion of the terminal hydroxyl function of the alkylene oxide block into a sulfate or phosphate ester in form of sodium, potassium and ammonium salts;
alkali metal and alkaline earth metal salts of alkylarylsulfonic acids having a straight-chain or branched alkyl chain;
alkali metal and alkaline earth metal salts of sulfate or phosphate ester of $C_8$-$C_{24}$ saturated and unsaturated aliphatic alcohols;
alkali metal and alkaline earth metal salts of $C_8$-$C_{24}$ alfa-olefin sulfonate;
alkali metal and alkaline earth metal salts of paraffin-sulfonic acids and chlorinated paraffin-sulfonic acids;
polyelectrolytes, such as lignosulfonates, condensates of naphthalene sulfonate and formaldehyde, polystyrene-sulfonates or sulfonated unsaturated or aromatic polymers;
anionic esters of alkylpolyglycosides, such as those described in WO 2010/100039, for example alkylpolyglucoside sulfosuccinate or citrate;
salts of sulfosuccinic acid, which are esterified once or twice with linear, or branched aliphatic, cycloaliphatic and/or aromatic alcohols, or sulfosuccinates which are esterified once or twice with (poly)alkylene oxide adducts of alcohols.

Examples of suitable cationic and ampholytic surfactants are quaternary ammonium salts, alkyl amino acids, and betaine or imidazoline amphotensides.

In a preferred embodiment, the surfactant is an nonionic surfactant. Preferred nonionic surfactants are, for example, polyalkoxylated, preferably polyethoxylated, saturated and unsaturated aliphatic alcohols, having 8 to 24 carbon atoms and having an average degree of alkoxylation (ethoxylation) of between 1 and 100, preferably between 4 and 40; sorbitan or sorbitol esters of fatty acids or polyalkoxylated, preferably polyethoxylated, sorbitan or sorbitol esters of fatty acids; alkylpolyglycosides or polyalkoxylated, preferably polyethoxylated, alkylpolyglycosides, and mixture thereof.

Most preferred nonionic surfactants are sorbitan or sorbitol esters of fatty acids or polyalkoxylated, preferably polyethoxylated, sorbitan or sorbitol esters of fatty acids.

The slurry of the invention can be prepared by first dissolving in water the salt c), the mutual solvent b), the optional surfactant f) and other additives (if any), then dispersing into the solution the pyromellitamide of formula I a) and, subsequently adding the thickener for aqueous systems d). Optionally, the surfactant f) and other additives can be added at the end of the procedure. The mixture so obtained is stirred with minimum shear, preferably soon as the pyromellitamide is added. It has been found that the lower the shear of mixing, the higher the solids content that can be reached. Any mixing device capable of producing low-shear mixing can be employed.

Usually, the slurry of the invention has a RV Brookfield® viscosity at 25° C. and 100 rpm lower than 3,000 mPa*s.

It is important to note that the slurries of the present invention have low viscosity and high solids content. They are also stable and characterized by prolonged shelf lives.

The above described pyromellitamide slurry can be used to prepare subterranean treatment fluids comprising a continuous oil phase.

The oil-based subterranean treatment fluid of the present invention comprises an oil phase and from 0,2 to 5.0% weight/volume, preferably from 0.5 to 4.0% weight/volume, of slurry.

The oil phase used in the subterranean treatment fluid of the present invention may be any oil suitable for use in oil-based fluids. The oil phase may derive from a natural or synthetic source.

Examples of suitable oils include, without limitation, diesel oils, paraffinic oils, mineral oils, low toxicity mineral oils, olefins, esters, amides, amines, synthetic oils such as polyolefins, ethers, acetals, dialkylcarbonates, hydrocarbons and combinations thereof.

The preferred oils are paraffin oils, low toxicity mineral oils, diesel oils, mineral oils, polyolefins, olefins and mixtures thereof.

Factors determining which oil phase will be used in a particular application, include but are not limited to, its cost and performance characteristics, environmental compatibility, toxicological profile and availability.

The oil-based subterranean treatment fluid of the present invention can also comprise an internal aqueous phase that is at least partially immiscible with the oil phase to obtain a water-in-oil emulsion or invert emulsion.

The concentration of the oil phase in the water-in-oil emulsion fluid should be sufficient so to form an invert emulsion and may be less than about 90 percent in volume of the invert emulsion (vol. %).

In an embodiment, the amount of oil phase is from about 20 to about 85 vol. %, preferably from about 50 to about 85 vol. % based on the total volume of the invert emulsion.

In a particular embodiment, invert high internal phase ratio emulsions, i.e. systems possessing a larger volume of internal aqueous phase (>50% in volume), are preferred because of the significant reduction of the oil phase, with its associated costs and possible environmental concern regarding potential contamination and subsequent waste disposal.

Examples of the aqueous phases, suitable for the preparation of the water-in-oil emulsion fluids of the invention, include fresh water, sea water, salt water, and brines (e.g. saturated salt waters), glycol, glycols, polyglycol amines, polyols and derivatives thereof, that are at least partially immiscible with the oleaginous fluid, and combinations thereof.

Suitable brines may include heavy brines.

Heavy brines, for the purposes of this application, include brines with various salts at variable concentrations, that may be used to densify a fluid; generally the use of weighting agents is required to provide a even higher density of the fluid.

Barite, calcium carbonate, dolomite, ilmenite, hematite, ground marble, limestone and mixtures thereof are examples of suitable weighting agents.

Brines generally comprise water soluble salts.

Suitable water soluble salts are, for example, sodium chloride, potassium chloride, calcium chloride, calcium bromide, zinc bromide, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, sodium bicarbonate, potassium bicarbonate, ammonium bicarbonate and mixtures thereof.

The aqueous phase is chosen taking into account several factors including cost, environmental and health safety profile, density, availability, and the oil phase that has been chosen. Another factor that may be considered is the application of the fluid.

For example, if the application needs an emulsion with a high specific gravity, a zinc bromide brine may be chosen.

The oil-based subterranean treatment fluids of the invention may further comprise conventional additives including emulsifiers, wetting agents, fluid loss agents, thinning agents, lubricants, anti-oxidants, corrosion inhibitors, scale inhibitors, defoamers, biocides, pH modifiers, and the like.

Such fluids, in particular, also contain at least one filtrate reducer preferably chosen among gilsonite, organophilic lignite, organophilic tannins, synthetic polymers, polycarboxylic fatty acids, or mixtures thereof.

When used in certain applications, the fluids may include particulates such as proppants or gravel.

The oil-based subterranean treatment fluids of the invention may be suitable for use in a variety of subterranean applications wherein oil-based fluids are used; these applications include drilling, completion, stimulation operations (such as fracturing) and work-over, sand control treatments such as installing a gravel pack, spotting, maintenance and reactivation.

To better illustrate the invention, the following examples are reported to show the preparation of various slurries of piromellitamides of the invention and their effect in exemplary oil based fluids.

EXAMPLES

Examples 1-3

Three aqueous slurries according to the invention were prepared with the ingredients reported in Table 1.

TABLE 1

| Ingredients (g) | Example 1 | Example 2 | Example 3 |
|---|---|---|---|
| Monoethylene Glycol | — | 21 | — |
| Glycerol | — | 8.5 | 15 |
| Diethylene Glycol | 44 | 5.7 | 27 |
| Xanthan Gum | 0.8 | 0.8 | 0.4 |
| Sodium Bicarbonate | 5.2 | 4 | 10 |
| Sorbilene O | 4 | 2 | — |
| Sorbilene L | — | 1 | 2 |
| KCl | — | — | 4.2 |
| Pyromellitamide | 23 | 30 | 15 |
| Water | 23 | 27 | 26.4 |

As pyromellitamide gelling agent of formula I, a N,N', N'',N'''-1,2,4,5-tetra-n-octyl pyromellitamide, prepared according to Example TO of WO 2013/040718, was used.

Sorbilene O is a sorbitan monooleate 20 EO (Polysorbate-80) and Sorbilene L is a sorbitan monolaurate 20 EO (Polysorbate-20). Both are commercialized by Lamberti S.p.A.

The slurries were prepared according to the following procedure:
- dissolve the salts in water;
- add the mutual solvents and mix;
- separate the solution in two equivalent aliquots (B1 and B2);
- disperse pyromellitamide chunks in B1 with a Silverson mixer, until the chunks are reduced to fine powder;
- dissolve the xanthan gum in B2;
- gradually pour under stirring B2 to B1 or viceversa;
- add the surfactants under stirring;

The RV Brookfield® viscosity of the slurries of Examples 1-3 was determined at 100 rpm and 25° C. Table 2 reports the results in mPa*s.

TABLE 2

|  | Viscosity |
|---|---|
| Example 1 | 2004 |
| Example 2 | 1845 |
| Example 3 | 2184 |

After 3 months at room temperature, the three slurries were still is homogeneous dispersions, without any sedimentation or separation of liquid phase.

Performance Test

The slurry of Example 1 was used to evaluate the viscosifying performances on oil based drilling fluids.

Two drilling muds according to the invention (MUD 2 and MUD 4) were prepared by means of a Silverson Mixer according to the formulations described in Table 3. The muds were prepared by adding the ingredients in the order in which they appear in the Table.

Two comparative muds (MUD 1 and MUD 3) were prepared with a commercial rheology modifier, Emulam V-Plus (organobentonite, commercialized by Lamberti USA).

For the preparation of the muds, the following other commercial products were used:
- Emulam PE, emulsifier, commercialized by Lamberti USA;
- Pliolite DF01, styrene-acrylate copolymer fluid loss reducer, commercialized by Eliokem USA.

TABLE 3

| Ingredients (g) | MUD 1* | MUD 2 | MUD 3* | MUD 4 |
|---|---|---|---|---|
| Diesel | 256 | 256 | 190 | 190 |
| Emulam V-Plus | 4.5 | — | 3.5 | — |
| Example 1 | — | 2 | — | 2.5 |
| Lime | 8 | 8 | 8 | 8 |
| Emulam PE | 6 | 6 | 8 | 8 |
| Brine 25% CaCl2 | 32.8 | 32.8 | 126.6 | 126.6 |
| Pliolite DF01 | — | — | 3.5 | 3.5 |
| Barite | 79.8 | 79.8 | 190 | 190 |

*Comparative

The rheological properties were determined before (BHR) and after (AHR) a hot rolling for sixteen hours at 120° C. according to the standard method ISO 10416-2002, par. 25.8. The electrical stability (ES) were determined after (AHR) hot rolling for sixteen hours at 120° C. The test conditions are described in ISO 10416-2002, par 25.10. The measurements were performed using a OFITE Model 800 8-Speed Viscometer. The results are reported in Table 4.

TABLE 4

|  |  | Mud 1* | | Mud 2 | | Mud 3* | | Mud 4 | |
|---|---|---|---|---|---|---|---|---|---|
|  | Units | BHR | AHR | BHR | AHR | BHR | AHR | BHR | AHR |
| Rheology 600 | lb/100 ft²** | 25 | 29 | 36 | 58 | 50 | 58 | 45 | 35 |
| 300 | lb/100 ft²** | 13 | 15 | 23 | 48 | 34 | 35 | 30 | 25 |
| 200 | lb/100 ft²** | 9 | 10 | 19 | 34 | 28 | 27 | 24 | 15 |
| 100 | lb/100 ft²** | 7 | 7 | 27 | 24 | 21 | 18 | 17 | 10 |
| 6 | lb/100 ft²** | 3 | 4 | 14 | 10 | 11 | 8 | 8 | 6 |
| 3 | lb/100 ft²** | 3 | 4 | 6 | 8 | 9 | 7 | 7 | 5 |
| 10 sec Gels | lb/100 ft²** | 3 | 4 | 5 | 11 | 11 | 8 | 8 | 6 |
| 10 min Gels | lb/100 ft²** | 4 | 4 | 6 | 11 | 13 | 12 | 8 | 6 |
| ES | Volt | — | 2000 | — | 1102 | — | 736 | — | 988 |

*Comparative
**1 lb/100 ft² = 0.479 Pa

The muds prepared with the slurry of the invention show good rheological characteristic, also after the thermal treatment, comparable with those comprising the gelling agent of the prior art. The good performances of the slurry were also demonstrated by the high electrical stability values.

The invention claimed is:

1. A slurry comprising:
   a) from 10 to 50% by weight (% wt) of a pyromellitamide of formula I:

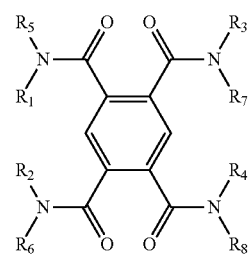

wherein $R_1$, $R_2$, $R_3$, and $R_4$ are, independently from each other, a linear or branched $C_4$-$C_{24}$ alkyl chain and $R_5$, $R_6$, $R_7$, and $R_8$ are, independently from each other, hydrogen or a linear or branched $C_4$-$C_{24}$ alkyl chain;
b) from 20 to 65% wt of a mutual solvent;
c) from 0 to 10% wt of a water-soluble inorganic salt;
d) from 0.05 to 5% wt of a thickener for aqueous systems;
e) from 10 to 50% wt of water.

2. The slurry of claim 1, comprising:
a) from 12 to 35% by weight, of said pyromellitamide of formula I;
b) from 30 to 50% wt of the mutual solvent;
c) from 5 to 10% wt of the water-soluble inorganic salt;
d) from 0.3 to 3% wt of the thickener for aqueous systems;
e) from 15 to 30% wt of water.

3. The slurry of claim 1, wherein, in formula I, $R_1$, $R_2$, $R_3$, and $R_4$ are, independently from each other, a linear or branched $C_6$-$C_{14}$ alkyl chain and $R_5$, $R_6$, $R_7$, and $R_8$ are, independently from each other, hydrogen or a linear or branched $C_6$-$C_{14}$ alkyl chain.

4. The slurry of claim 3, wherein, in formula I, $R_1$, $R_2$, $R_3$, $R_4$ are identical and are a linear or branched $C_6$-$C_{10}$ alkyl chain and $R_5$, $R_6$, $R_7$, and $R_8$ are all hydrogen.

5. The slurry of claim 1, wherein said mutual solvent is selected from the group consisting of linear or branched $C_1$-$C_6$ alcohols, glycols, polyglycols, glycol ethers, polyols and mixtures thereof.

6. The slurry of claim 1, further comprising:
from 0.1 to 10% by weight of a surfactant.

7. The slurry of claim 6, wherein said surfactant is a non-ionic surfactant.

8. A oil-based subterranean treatment fluid comprising an oil phase and the slurry of claim 1.

9. The oil-based subterranean treatment fluid of claim 8, comprising the oil phase and from 0.5 to 5.0% weight/volume of said slurry.

* * * * *